(12) United States Patent
Allais et al.

(10) Patent No.: US 7,325,840 B2
(45) Date of Patent: Feb. 5, 2008

(54) ARRANGEMENT FOR CONNECTING A FIBER-REINFORCED PLASTIC PIPE TO A STAINLESS STEEL FLANGE

(76) Inventors: Arnaud Allais, Wallmodenstrasse 47, D-30625 Hannover (DE); Ernst Hoffmann, Baeckerweg 11, D-30855 Langenhagen (DE)

( * ) Notice: Subject to any disclaimer, the term of this patent is extended or adjusted under 35 U.S.C. 154(b) by 94 days.

(21) Appl. No.: 11/131,924

(22) Filed: May 18, 2005

(65) Prior Publication Data
US 2006/0279083 A1 Dec. 14, 2006

(51) Int. Cl.
*F16L 47/00* (2006.01)

(52) U.S. Cl. .............. 285/290.3; 285/290.4; 285/291.1; 285/904; 505/230

(58) Field of Classification Search ............. 285/290.3, 285/290.4, 291.1, 290.1, 414, 415, 416, 904; 439/208, 210; 505/230; 62/51.1
See application file for complete search history.

(56) References Cited

U.S. PATENT DOCUMENTS

| | | | | |
|---|---|---|---|---|
| 1,802,665 A | * | 4/1931 | Monteux | 285/55 |
| 1,881,915 A | * | 10/1932 | Howard | 285/382.2 |
| 2,427,685 A | * | 9/1947 | Midtlyng et al. | 29/890.144 |
| 2,698,193 A | * | 12/1954 | Kennison | 277/625 |
| 3,224,795 A | * | 12/1965 | Conley | 285/114 |
| 4,526,410 A | * | 7/1985 | Vohrer | 285/222.1 |
| 4,634,314 A | * | 1/1987 | Pierce | 405/224.2 |

FOREIGN PATENT DOCUMENTS

DE 3237320 * 5/1983 .............. 285/290.3

* cited by examiner

*Primary Examiner*—David Bochna
(74) *Attorney, Agent, or Firm*—Sofer & Haroun, LLP

(57) ABSTRACT

Arrangement for connecting a fiber-reinforced plastic pipe (18) to a stainless steel flange (12, 16), in which the end of the fiber-reinforced plastic pipe (18) is accommodated in a ring-shaped groove (12a, 16a) in the flange (12, 16), the groove conforming to the dimensions of the fiber-reinforced plastic pipe (18), where the gap remaining between the end of the fiber-reinforced plastic pipe (18) and the ring-shaped groove (12a, 16a) is filled with a sealant (19).

7 Claims, 2 Drawing Sheets

ARRANGEMENT FOR CONNECTING A FIBER-REINFORCED PLASTIC PIPE TO A STAINLESS STEEL FLANGE

GOVERNMENT LICENSE RIGHTS

This invention was made with government support under contract No. DE-FC36-00GO13032 awarded by the Department of Energy (DOE). The government has certain rights in the invention.

FIELD OF THE INVENTION

The invention pertains to an arrangement for connecting a fiber-reinforced plastic pipe to a stainless steel flange.

BACKGROUND OF THE INVENTION

In electrical equipment with conductors cooled to low temperature, it is often necessary to supply the electric current to the cooled conductors from a power supply at ambient temperature. This applies in particular to superconducting cables, the superconductors of which must be cooled down to a temperature below the transition temperature of the superconducting material.

A superconducting cable is known from EP 1 363 062 A1, which passes through a so-called cryostat. The cryostat consists of two concentric, corrugated metal pipes. Between the corrugated metal pipes is a blanket of so-called superinsulation consisting of alternating layers of metal foil and cold-resistant plastic film, e.g., film based on polyester. The film obtainable commercially under the trade name "Mylar" is preferred. Mylar is a registered trademark of Du Pont de Nemours. The annular gap between the metal pipes is also evacuated.

With respect to the current supply, care must be taken to ensure that the high voltage-carrying conductor of the power supply is isolated from the cryostat, which is at standard potential. It is also necessary for the vacuum present in the annular gap to be sealed off against the interior of the cryostat.

OBJECTS AND SUMMARY OF THE INVENTION

The present invention is therefore based on the task of providing an arrangement which is able to isolate the cryostat from the current-carrying conductor or power supply and simultaneously to seal off the annular gap between the metal pipes of the cryostat in a vacuum-tight manner against the environment.

The arrangement according to the principle of the invention is able to withstand repeated temperature cycles between 300 and 77 K without damage. The inventive arrangement is not subject to the shrinkage which normally occurs as a result of temperature changes.

Another significant advantage is to be found in that the arrangement can be produced without the need to subject the cable to a great deal of work after it has been laid. The arrangement is also characterized by high mechanical strength.

BRIEF DESCRIPTION OF THE DRAWINGS

The invention is explained in greater detail below on the basis of the exemplary embodiments, which are illustrated schematically in FIGS. 1-4.

DETAILED DESCRIPTION OF THE INVENTION

Figure 1:
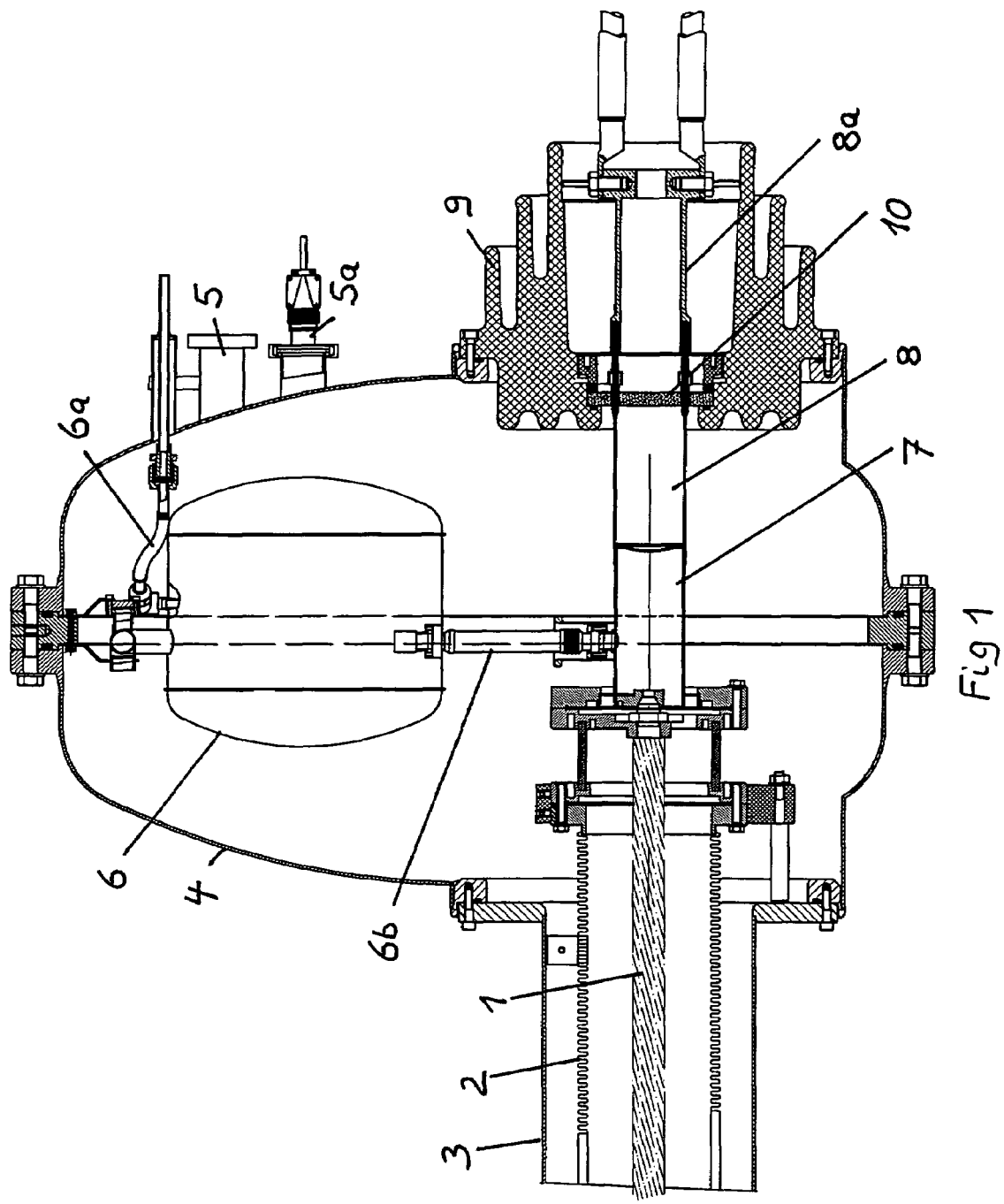
FIG. 1 shows the power connection of a superconducting cable.

The superconducting cable is designated by the number 1. It is located in a cryostat, which consists of a corrugated inner metal pipe 2, preferably of stainless steel, and an outer metal pipe 3.

A corrugated metal pipe (not shown), which also consists advantageously of stainless steel, is welded to the end of the outer metal pipe 3. A liquid coolant flows through the interior of the metal pipe 2. If the superconducting material of the superconducting cable is a high-temperature superconducting material such as one of the materials based on mixtures of copper oxide, barium oxide, and yttrium oxide, or other oxide mixtures, liquid nitrogen is used as the liquid coolant. The space between the metal pipes 2 and 3 is filled by a series of alternating layers of metal foil and plastic film. The space is also evacuated. This type of insulation is referred to in superconducting technology as "superinsulation".

The evacuated annular space located between the metal pipes 2 and 3 is connected vacuum-tight to the interior space of a vessel 4, which consists of two half-shells. The vessel 4 is connected by the connector 5 to a vacuum pump (not shown). A manometer 5a monitors the vacuum in the tank 4.

The metal pipe 3 is connected by a flange to the vessel 4 in a vacuum-tight manner.

In the interior of the vessel 4, a tank 6 for liquid nitrogen is provided, which is connected by a pipeline 6a to a reservoir for the coolant (not shown). The tank 6 is connected by a pipeline 6b to the interior of a section of pipe 7 and thus to the interior of the metal pipe 2.

The pipe section 7 consists of a metal of good electrical conductivity, preferably of copper, and is connected electrically to the conductor (not shown) of the superconducting cable.

A component 8 consisting of a plurality of plates is electrically connected to the end of the pipe section 7 facing away from the connection to the conductor of the superconducting cable 1. These plates are also made of copper. The opposite end 8a of the component 8 is connected to a power source (not shown).

The components 8 and 8a are surrounded by an insulating body 9, which is recessed vacuum-tight into the wall of the vessel 4. The insulating body 9 has the job of electrically insulating the power supply passing through the components 8 and 8a, which are at high-voltage potential, from the vessel 4. In the insulating body 9 there is also a sealing disk 10 of aluminum oxide, which seals off the interior of the vessel 4, which is under vacuum, from the outside.

Figure 2:
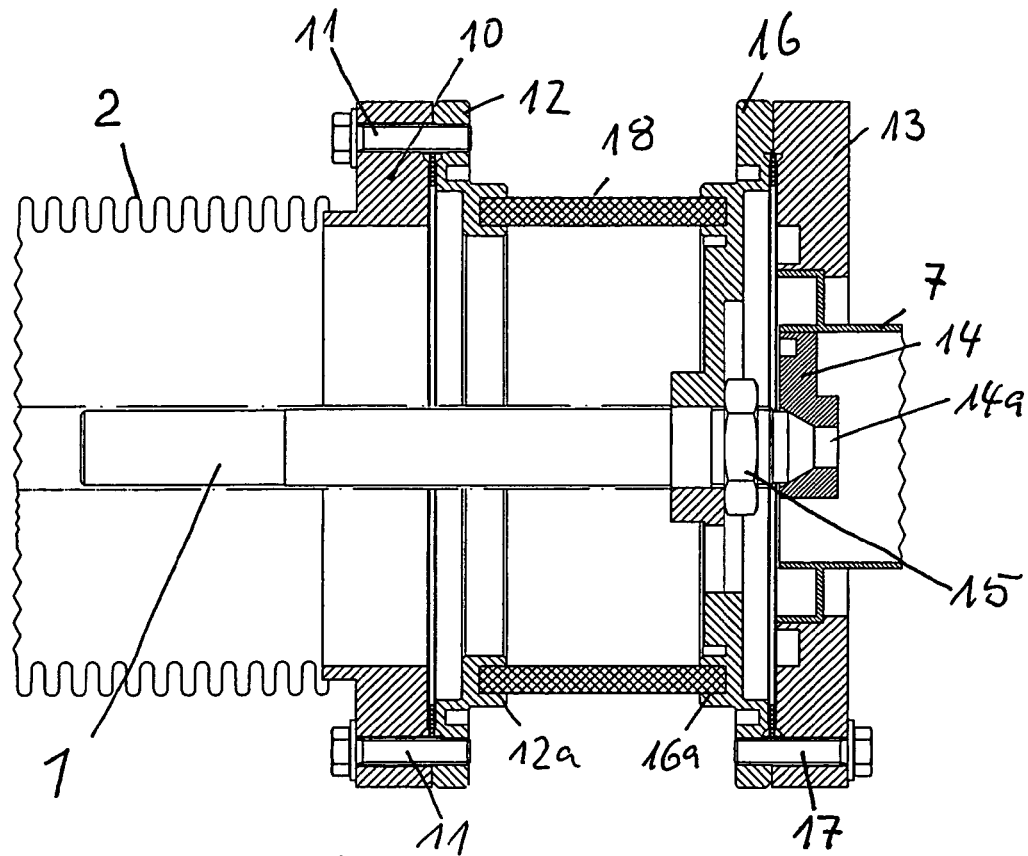
FIG. 2 shows in greater detail how the pipe section 7 and the end of the superconducting cable 1 are connected to each other.

FIG. 2 shows in greater detail how the pipe section 7 and the end of the superconducting cable 1 are connected to each other.

The end of the metal pipe 2 is welded vacuum-tight to a first flange 10, which is clamped by clamp bolts 11 to a second flange 12.

The end of the pipe section 7 is recessed into a third flange 13. A metal body 14 of copper is soldered into the interior of the pipe section 7. The copper body 14 has a bore 14a, which expands conically. The end of the conductor of the superconducting cable 1 is introduced into the conical expansion of the bore 14a. A nut 15 is screwed on to the end of the cable. Permanent electrically conductive contact is established for the end of the conductor of the superconducting cable 1 by the use of another flange 16, which is clamped to the flange 13 by the clamp bolts 17. As a result, the end of the conductor is firmly seated in the conical expansion of the bore 14a. Between the flanges 12 and 16 there is a pipe 18 of high-strength plastic. A pipe of fiber-reinforced epoxy resin is preferably used.

The ends of the pipe 18 are recessed vacuum-tight into ring-shaped grooves 12a and 16a in the flanges 12 and 16. The metal pipe 2 of the cryostat is galvanically separated from the flange 16 and thus from the power supply by the electrically insulating pipe 18. In addition, the pipe 18 is recessed vacuum-tight into the grooves 12a and 16a.

Figure 4:
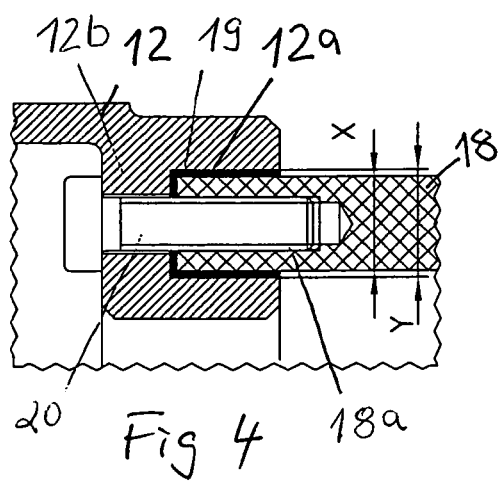
FIGS. 3 and 4 show the enlarged areas of the grooves and the ends of the pipe from FIG. 2.
Figure 3:
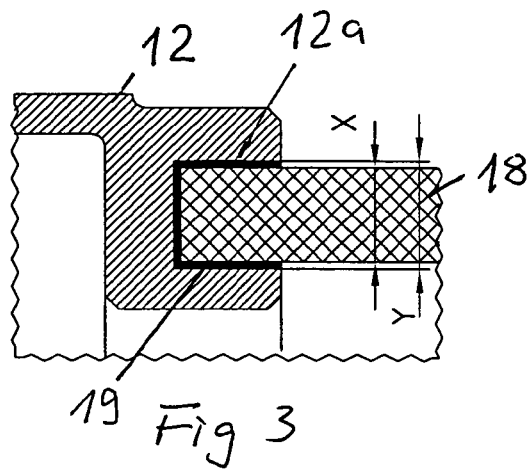

The area of the grooves 12a, 16a and the ends of the pipe 18 are shown on an enlarged scale in FIGS. 3 and 4. The width Y of the groove 12a is slightly larger than the wall thickness X of the pipe 18, so that a gap is formed, which is filled with sealant 19. It is especially advantageous for the width of the gap to be in the range of 0.1-0.5 mm. This also applies to the gap between the end surface of the pipe 18 and the base of the groove 12a.

The opposite end of the pipe 18 is recessed into the groove 16a of the flange 16 in the same way.

To produce the connection, the ends of the pipe 18 are coated with a curable sealant and introduced into the grooves 12a and 16a, and/or the flanges 12 and 16 are pushed onto the sealant-coated ends of the pipe 18.

It is advantageous to use Stycast and Eccobond sold by Emerson & Cuming as the sealant.

In the exemplary embodiment according to FIG. 4, a bore 12b is introduced into the flange 12, through which a screw bolt 20 is inserted. This bolt is screwed into a thread 18a in the pipe 18. Thus a mechanically strong connection is established between the flanges 12, 16 and the pipe 18, which will therefore remain vacuum-tight even over a prolonged period of time.

The invention claimed is:

1. Arrangement for connecting a current carrying part of a superconducting cable with a cryostat comprising:
   a fiber-reinforced plastic pipe accommodated in a ring shaped groove of a stainless steel flange, wherein
   the shape of the groove conforms to the dimensions of the fiber-reinforced plastic pipe, and in that the gap remaining between the end of the fiber-reinforced plastic pipe and the ring-shaped groove is filled with a sealant, wherein both the current-connecting part of the superconducting cable and the cryostat are connected to said stainless steel flange.

2. Arrangement according to claim 1, wherein the fiber-reinforced plastic pipe is made from fiber-reinforced epoxy resin.

3. Arrangement according to claim 1, wherein the sealant is an adhesive based on epoxy resin.

4. Arrangement according to one of claim 1, wherein the width of the gap between the fiber-reinforced plastic pipe and the flange is in the range of 0.1-0.5 mm at all points.

5. Arrangement according to one of claim 1, wherein the fiber-reinforced plastic pipe is connected to the flange by a screwed connection.

6. Arrangement according to one of claim 1, wherein said arrangement is used for connecting a high voltage potential to a ground potential.

7. Arrangement according to claim 6, wherein said arrangement is used as a terminal connection of a superconducting cable passing through a cryostat.

* * * * *